United States Patent [19]

Yarm

[11] 4,007,997
[45] Feb. 15, 1977

[54] ROTOR DIAMETER INDICATOR

[75] Inventor: Jay Martin Yarm, Milford, Conn.

[73] Assignee: United Technologies Corporation, Hartford, Conn.

[22] Filed: Nov. 5, 1975

[21] Appl. No.: 628,873

[52] U.S. Cl. .................................. 416/61; 416/89
[51] Int. Cl.² ........................................ B64C 11/28
[58] Field of Search ................. 416/61, 87, 88, 89

[56] References Cited

UNITED STATES PATENTS

| | | | |
|---|---|---|---|
| 2,381,991 | 8/1945 | Symons | 416/61 X |
| 2,403,899 | 7/1946 | Ammen | 416/61 X |
| 2,485,245 | 10/1949 | Schoenbaum | 416/61 |
| 3,297,094 | 1/1967 | Kisovec | 416/89 |
| 3,501,248 | 3/1970 | Brocker | 416/89 |
| 3,713,751 | 1/1973 | Fradenburgh et al. | 416/87 |
| 3,768,923 | 10/1973 | Fradenburgh | 416/89 |
| 3,814,351 | 6/1974 | Bielawa | 416/87 X |

*Primary Examiner*—Everette A. Powell, Jr.
*Attorney, Agent, or Firm*—Vernon F. Hauschild

[57] ABSTRACT

A variable length blade in telescopic form adapted to be used with similar blades to form a variable diameter rotor or propeller wherein the outer blade portion, at the will of the pilot, is caused to telescope with respect to the inner blade portion by jackscrew action and means are provided for limiting the extending and retracting movements of the blades and also for providing a continuing visual indication of the diameter of the rotor.

6 Claims, 2 Drawing Figures

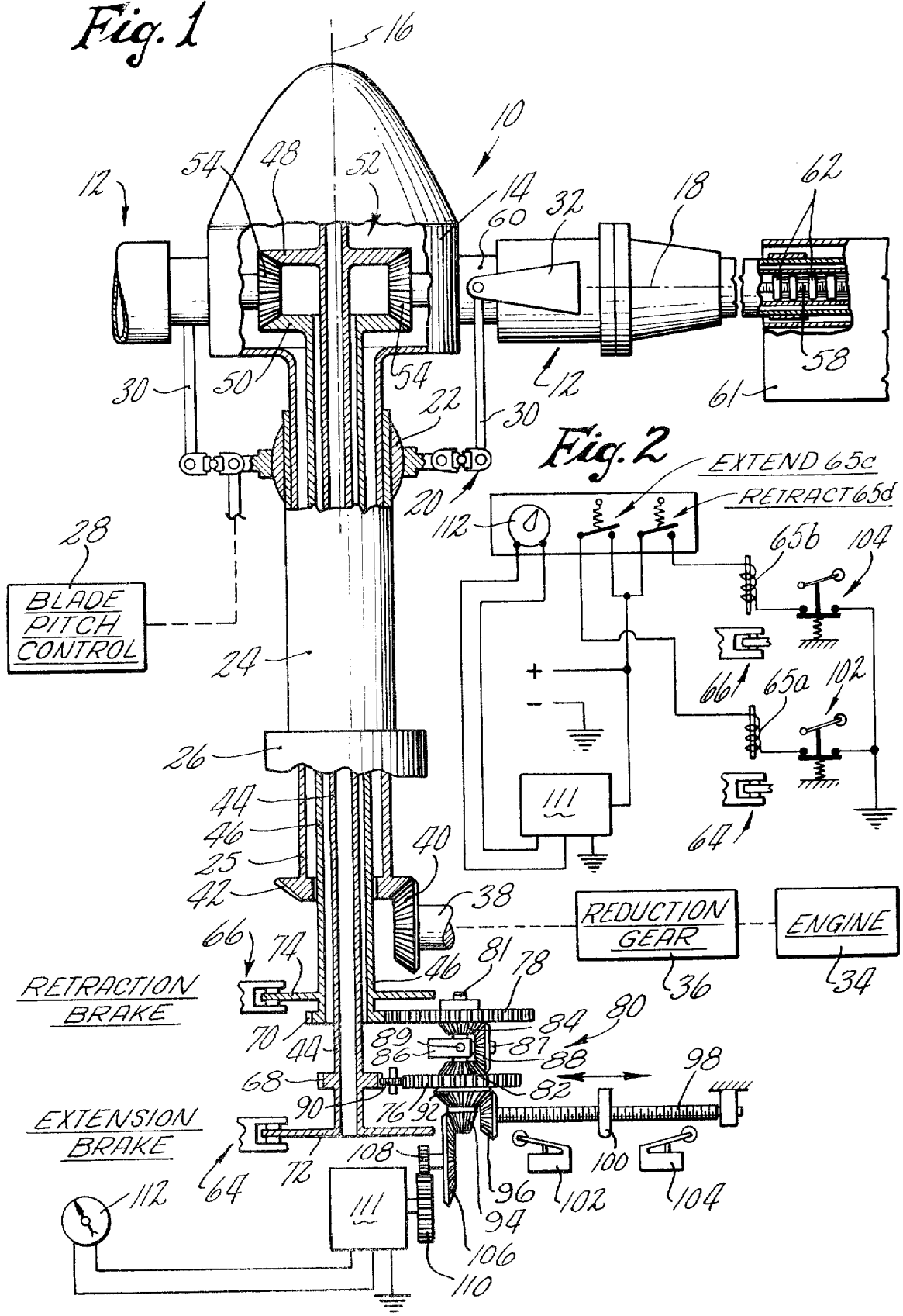

ROTOR DIAMETER INDICATOR

BACKGROUND OF THE INVENTION

1. Field of Invention

This invention relates to variable diameter rotors or propellers of the aircraft type which consist of a plurality of variable length telescopic blades actuated to change their length by jackscrews in which the outer telescopic portion of each blade is connected to the nut assembly of a jackscrew carried by the inboard portion of the blade, and relates particularly to means for limiting the extension and contraction of the outer blade portion and also to means for providing a continuing visible indication of the diameter of the rotor.

2. Description of the Prior Art

In the variable diameter rotor art, blades of telescopic construction have been used to vary in length and hence to vary the diameter of the rotor by means of jackscrew mechanisms. One such construction is shown in U.S. Pat. No. 3,884,594, issued May 20, 1975 to Evan A. Fradenburgh in which each blade of the rotor consists essentially of an inner portion mounted on the rotor hub in which the jackscrew is mounted and a telescoping outer portion connected to a traveling nut on the jackscrew. In this construction there was no means for the pilot to determine accurately what the diameter of the rotor was and no means other than the pilot's controls for limiting the extending and retracting movements of the blades.

SUMMARY OF THE INVENTION

An object of the present invention is to provide improvements in variable diameter rotors or propellers for use in aircraft of the type utilizing variable length blades actuated by jackscrew mechanisms.

The jackscrew mechanisms of the several blades are operated in unison by the pilot to extend and retract the telescoping outboard portions of the blades by controls in the pilot's compartment, but it is difficult for the pilot to tell to what extent the blade tips are extended, especially in flight.

Located at the base of the transmission assembly between two clutch discs controlling the blade extension and retraction shafts is a miniature gear differential that is part of the mechanical system to measure and control rotor diameter. The differential senses relative motion of the extension and retraction shafts. During constant rotor diameter operation the two shafts rotate in unison at main rotor shaft speed, but during a diameter change there is relative motion between the shafts. The miniature differential is geared to the two shafts by means of small ring gears located between the clutch discs. One of these gears meshes directly with one of the gear inputs on the miniature differential, and the other is connected to the other gear input through an idler gear to reverse the direction. In this manner the centerbody of the differential does not rotate during constant rotor diameter operation, but does rotate during a rotor diameter change. The rotation of the differential centerbody, which is the output function which averages the two input rotations, is in one direction during a diameter decrease and in the opposite direction during a diameter increase. The number of turns of the centerbody is in direct relationship to the relative angular displacement of the two shafts. Please note that the cockpit display may be operated directly and mechanically by suitable gearing and shafting, and necessarily need not be through electrical intermediaries.

The output (differential centerbody rotation) is mechanically geared to a multi-turn potentiometer used for cockpit display of rotor diameter. The differential output also operates a miniature jackscrew with a traveling nut which actuates minimum and maximum diameter limit switches that are part of the clutch control system.

It is, therefore, another object of this invention to provide means for giving a continuing visible indication to the pilot of the diameter of the rotor.

A further object of this invention is to provide means in a variable diameter rotor having extensible and retractible blade tips, other than the usual pilot's controls, for limiting the extending and retracting movements of the blade tips.

A still further object of this invention is generally to improve the construction and performance of variable diameter rotor and propeller aircraft.

BRIEF DESCRIPTION OF THE DRAWINGS

FIG. 1 is a partial showing, parts being broken away, of a variable diameter rotor illustrating my invention.

FIG. 2 is a wiring diagram for the diameter changing and diameter indicating mechanism of the rotor of FIG. 1.

DESCRIPTION OF THE PREFERRED EMBODIMENT

Referring to the drawing, a variable diameter rotor 10 is shown consisting of a plurality of spaced rigidly mounted blades 12 projecting from rotor hub 14 for rotation therewith about rotor axis of rotation 16. Blades 12 are supported in a usual manner by stack bearings (not shown) for pitch change about blade feathering axis 18 so that the blade pitch may be changed both cyclically and collectively.

Swashplate assembly 20, more fully disclosed in U.S. Pat. No. 2,925,130, is supported from spherical bearing 22 and standpipe 24 the latter of which projects from the transmission housing 26. Blade pitch controls 28 are conventional and may be of the type disclosed more fully in U.S. Pat. No. 3,199,601. These controls are utilized to translate swashplate assembly 20 along axis 16 and act through pitch change rods 30 and horns 32 to collectively vary the pitch of blades 12. Control 28 can also tilt swashplate assembly 20 with respect to axis 16 and thereby cyclically vary the pitch of the blades. These cyclic pitch variations occur throughout the rotation of blades 12.

While rotor 10 has been shown as a rigid rotor, the invention is applicable to rotors of the articulated type shown in U.S. Pat. No. 2,925,130 in which a universal joint is used in the jackscrew shaft.

Rotor 10 is driven by engine 34. This drive includes reduction gear 36, power input shaft 38 and bevel gear 40 carried by shaft 38 which meshes with bevel gear 42 on the main rotor drive shaft 25.

The mechanism which effects changes in diameter of rotor 10 includes shafts 44,46 which are within rotor drive shaft 25 and are coaxial therewith. Shaft 44 is the blade extension shaft and is within shaft 46 which is the blade retraction shaft. These two shafts are positioned within rotor drive shaft 25 for rotation about axis 16 by suitable bearings (not shown). Shafts 44,46 carry bevel gears 48,50 at their respective upper ends which are oppositely facing and form a part of a differential gearing 52 which also includes pinion gears 54, one pinion gear being provided for each blade 12 of the rotor and all of which mesh with bevel gears 48,50. Pinion gears 54, are the output gears of differential gearing 52 and are directly connected to jackscrew shafts 58, one of which is mounted for rotation on suitable bearings (not shown) in the inboard portion 60 of each blade. Each blade 12 has an outboard portion 61 which telescopes relative to the inboard portion of the blade and thereby provides means for varying the length of the blade and hence the diameter of the rotor. The outboard portion of the blade is connected by flexible straps to one or more threaded nuts 62 which travel along the jackscrew as the latter is rotated by its pinion gear. This construction is shown in detail in U.S. Pat. No. 3,884,594 referred to previously and reference is made to this patent for a more detailed description of this construction.

As engine 34 drives rotor 10 about axis 16, blade extension and retraction shafts 44,46 will rotate therewith since main rotor drive shaft 25 and shafts 44,46 are tied together by pinions 54, so that normally they all rotate together as a unit. During this rotation, hub 14 of rotor 10 constitutes the center housing of differential gearing 52. Clutch mechanism 64,66 are associated with shafts 44,46 respectively. Both clutches are pilot operated through soleniod mechanism (FIG. 2) including solenoids 65a and 65b for clutches 64,66 respectively by which either of the two clutches can be applied separately. If both clutches were applied simultaneously neither would be effective and normal rotation of rotor 10 would continue.

When extension clutch 64 is applied by closing normally open switch 65c shaft 44 and bevel gear 48 are stopped and, as rotor drive shaft 25 and hub 14 continue to rotate, pinion gears 54 will be caused to rotate about their own axes in the same direction relative to their respective jackshafts 58. Jackshafts 58 will rotate in unison in a direction to move the nut assemblies 62 outboard along blade feathering axis 18 which coincides with the axis of the jackscrews. Translation of the nut assembly away from hub 14 will permit centrifugal force to telescope, or slide, outer blade portion 61 outwardly with respect to inner blade portion 60 thereby increasing the diameter of rotor 10.

Application of retraction clutch 66 by closing of normally open switch 65d will stop shaft 46 and bevel gear 50 and, as rotor drive shaft 25 and hub 14 continue to rotate, pinion gears 48 will be caused to rotate about their own axes and thereby rotate jackscrew shafts 58 in the opposite direction from that caused by application of extension clutch 64. This will translate nut assembly 62 inwardly to act through the tension straps to telescope outer blade portion 61 inward toward hub 14, thereby reducing the diameter of rotor 10. The pitch of the threads of jackscrews 58 and nut assemblies 62 determine the rate of diameter change of rotor 10.

In accordance with this invention, means is provided for giving a continuous visible indication of the diameter of the rotor. Preferably the rotor diameter indicator 112 is located in the pilot's compartment, although it can be placed in other locations where it can be seen by the pilot. Shafts 44,46 have gears 68,70 fixed to their lower ends between clutch discs 72,74 which drive spur gears 76,78 of a second miniature gear differential 80. Gears 76,78 are rotatably mounted on shaft 81 of gear differential 80 and carry bevel gears 82,84 on opposite sides of a differential centerbody 86 which is mounted on shaft 81 and is pinned thereto by pin 89. Centerbody 86 carries a shaft 87 at right angles to shaft 81 on which a pinion gear 88 is mounted for rotation relative thereto. Pinion 88 meshes with gears 82,84 completing the differential gearing.

Shafts 44,46 rotate in the same direction and consequently it is necessary to provide an idler gear 90 between gear 68 and gear 76 of the miniature differential gearing since spur gears 76,78 and their attached gears 82,84 rotate in opposite directions due to gear 88 common to them. Shaft 81 of the second gear differential, which is the output shaft, carries two bevel gears 92,94 at its lower end. Gear 92 meshes with a bevel gear 96 fixed to a jackscrew 98 which carries a traveling nut 100 that cooperates with adjustable diameter-limiting switches 102,104. These limit switches are normally closed switches and control the opening of the circuits for solenoids 65a, 65b which actuate the clutches 64,66.

Bevel gear 94 meshes with bevel gear 106 which carries a pinion gear 108 meshing with a spur gear 110 of a multiturn potentiometer 111, or similar device, for actuating rotor-diameter indicator 112. It will be understood that as the potentiometer rotates through its range of, for example, ten turns the indicator needle of indicator 112 moves progressively over its scale which covers a range from minimum to maximum diameter of the rotor.

While the driving gears 68,70 for the gear differential 80 have been shown as attached to the extension shaft 44 and the retraction shaft 46, it will be obvious that, since these two shafts and the main rotor drive shaft 25 normally all rotate together in the same direction and at the same speed, gears 68,70 can be attached to any two of the three shafts 25, 44 and 46. This is true because in changing rotor diameter only one clutch 64 or 66 is applied at the same time. If inadvertently both brakes were applied simultaneously differential 52 would remain in its normal condition and no change of rotor diameter would take place. In the structure shown it was more convenient to take the miniature gear differential drives from shafts 44,46.

In the operation of the structure above described, when the helicopter is in flight, or is on the ground with the rotor turning, the main rotor drive shaft 25, because of differential gearing 52, carries extension and retraction shafts 44,46 around with it. In other words, the whole rotor head 10 rotates bodily. The prevailing diameter of the rotor will be shown on indicator 112 and nut 100 will be located in a corresponding position somewhere between limit switches 102,104. Spur gears 68,70 will rotate gears 76,78 in opposite directions due to idler gear 90 and shaft 81 will remain stationary while gear 88 will rotate on its own shaft 87 on centerbody 86.

If the pilot wishes to increase the diameter of the rotor he will close normally open switch 65c to activate solenoid 65a which applies clutch 64, stopping blade extension shaft 44 and its attached gear 48 of differential gearing 52. Pinion gears 54 will now roll around fixed gear 48, as the rotor head turns, causing jackscrew shafts 58 to rotate in the same direction relative to their respective blades and move nut assemblies 62 in an outboard direction, permitting the blades to extend under centrifugal force.

Applying clutch 64 will also simultaneously cause spur gear 68 to stop rotating which will result in holding gears 76 and 82. Now gear 88 will roll about fixed gear 82, driven by gear 84, and centerbody 86 will be caused to rotate together with shaft 81 in the appropriate direction to cause the potentiometer 111 to move the needle of indicator 112 in a diameter increasing direction. At the same time gear 92 will rotate gear 96 on jackscrew 98 to move nut 100 toward limit switch 102 which is associated with the circuit of solenoid 65a for applying clutch 64. Normally, watching the movement of the needle of diameter indicator 112, the pilot will release normally open switch 65c to de-activate solenoid 65a before nut 100 engages normally closed limit switch 102. Should he fail to do so, switch 102 will automatically open and cause clutch 64 to be released.

Retraction of the blades to decrease the rotor diameter is accomplished by closing normally open switch 65d and applying clutch 66 to hold shaft 46. In this case gears 54 roll about fixed gear 50 which is on the opposite side of output gears 54 and hence rotates the latter with their connected jackscrew shafts in the opposite direction from that described in connection with blade extension. Consequently nut assemblies 62 now pull in outboard blade portions 61. At the same time shaft 81 of differential gear 80 will be rotated in the opposite direction from that described during blade extension by the rolling of gear 88 about fixed gear 84. The resulting rotation of shaft 81 by centerbody 86 moves nut 100 toward limit switch 104, i.e., in the opposite direction from that described during blade extension. The opposite rotation of shaft 81 also causes potentiometer 111 to move in a reverse direction and move indicator 112 toward blade retracted position.

I wish it to be understood that I do not desire to be limited to the exact details of construction shown and described, for obvious modifications falling within the scope of the following claims will occur to persons skilled in this art.

I claim:

1. In a helicopter rotor, a plurality of blades, each having inner and outer telescoping blade portions and a jackscrew shaft for extending and retracting said outer blade portion to vary the length of the blade, a rotor drive shaft having a hub to which said inner blade portions are attached, means for extension and retraction of said blades including a differential gearing in said hub, concentric inner and outer blade extension and retraction shafts within said rotor drive shaft, said concentric shafts having input gears in said hub comprising the differential gears of said differential gearing, output bevel gears in said hub fixed to the inboard ends of said jackscrew shafts and meshing with said input bevel gears, clutch means on said extension and retraction shafts operable by the pilot for holding one or the other of said shafts, a drive gear fixed to each of said extension and retraction shafts, a second differential gearing including a centerbody having a differential output shaft fixed thereto, differential input gears journaled for rotation on said output shaft on opposite sides of said centerbody each driven by one of said drive gears on said extension and retraction shafts, differential bevel gears fixed to said input gears, a bevel gear mounted for rotation on said centerbody and meshing with said differential bevel gears, a drive gear fixed on said output shaft, a potentiometer driven by said output shaft drive gear, and a rotor-diameter indicator electrically connected to said potentiometer.

2. Apparatus according to claim 1 wherein the clutch means for the extension and retraction shafts are operated by soleniods in separate circuits controlled by the pilot, a second drive gear is provided on the output shaft of said second differential gearing and a second jackscrew shaft having a traveling nut is driven from said second drive gear, and normally closed limit switches in the circuits of said solenoids are located in position to be engaged and opened by said nut when the latter reaches the extension and retraction limits of said blades.

3. In a helicopter rotor, a main rotor hub, a rotor drive shaft for rotating said hub, a plurality of variable length blades connected to said hub for rotation therewith, each having telescoping inner and outer blade portions, a jackscrew shaft mounted for rotation on the inboard blade portion having a traveling nut, and means for connecting said nut to said outboard portion for extending and retracting the latter as said shaft is rotated in opposite directions, output bevel gears on the inboard ends of said jackscrew shafts, coaxial extension and retraction shafts mounted within said main drive shaft having differential bevel gears meshing with said output bevel gears on said jackscrew shafts, said differential gears on said extension and retraction shafts being located one above and the other below said output bevel gears, solenoid operated clutch means on the lower ends of said extension and retraction shafts for selectively holding either of said shafts, said solenoids being connected in separate circuits including normally open switches operable by the pilot, a second differential gearing adjacent said extension and retraction shafts having a centerbody including a differential output shaft fixed to said centerbody and two differential input gears rotatable on said output shaft on opposite sides of said centerbody, drive gears on said extension and retraction shafts each connected with one of said input gears, a bevel gear rotatable on said centerbody meshing with said differential input gears, two drive gears fixed to said differential output shaft, a second jackscrew shaft driven by one of said drive gears on said differential output shaft having a traveling nut thereon, normally closed limit switches controlling said solenoid operated clutch means in position to be engaged by said nut, a multi-turn potentiometer driven by the other of said drive gears on said output shaft, and a rotor-diameter indicator connected electrically to said potentiometer.

4. In a helicopter rotor, a plurality of blades, each having inner and outer blade portions for varying blade length and having a jackscrew shaft rotatably mounted in said inner blade portion on the longitudinal blade axis having a traveling nut operatively connected to said outer blade portion, a rotor hub to which said inner blade portions are attached, a differential gearing in said hub including differential output pinions on the inboard ends of the jackscrew shafts of the several blades, two differential input gears meshing with said output pinions above and below said longitudinal blade axes, a main rotor drive shaft carrying said rotor hub at its upper end, a blade extension shaft within and coaxial with said rotor drive shaft connected to one of said differential input gears, a blade retraction shaft between and coaxial with said rotor drive shaft and said blade extension shaft connected to the other differential output gear, means for measuring and controlling rotor diameter including a mini-differential gearing including a centerbody having two differential input gears mounted for rotation thereon on opposite sides of said centerbody, two drive gears for said mini-differential gearing on two of said three coaxial shafts, geared driving connections between said drive gears and said input gears, means in one of said driving connections including an idler gear for reversing the rotation of one of said input gears, a gear mounted for rotation on said centerbody meshing with both of said input gears, an output shaft connected to said centerbody for rotation therewith about the axis of rotation of said input gears, means to effect rotation of said output shaft in one direction to cause a diameter increase and in the opposite direction to cause a diameter decrease of said blades including clutch means for selectively holding one or the other of said blade extension and blade retraction shafts, a potentiometer driven by said output shaft of said mini-differential, and a rotor diameter indicator electrically connected to said potentiometer for giving a visual display of rotor diameter.

5. Apparatus according to claim 4 wherein means is provided to limit the extending and retracting movements of the blades including a mini-jackscrew shaft driven by said output shaft of said mini-differential, solenoids for operating said clutch means, normally closed limit switches each in a different circuit of the solenoids associated with said clutch means, and a traveling nut on said mini-jackscrew shaft adapted to engage said limit switches to de-activate the respective clutch.

6. In a helicopter rotor, a rotor hub, a plurality of variable pitch blades, each having an inner blade portion connected to said hub and a telescoping outer portion slidable relative to said inner portion to vary blade length, a jackscrew shaft rotatably mounted in said inner blade portion parallel with said blade pitch changing axis having a traveling nut operatively connected with said outer blade portion, a first differential gearing in said hub having an output pinion for each blade carried by respective blade jackscrew shafts, two differential input gears meshing with said pinions, one above the pitch changing axes and the other below said axes, a main rotor drive shaft carrying said rotor hub at its upper end, blade extension and retraction shafts concentric with said main drive shaft and rotatable relative thereto, each of said extension and retraction shafts being connected to a different differential input gear, clutch means under the control of the pilot for holding either said extension shaft or said retraction shaft for changing blade length, means providing a continuous indication of rotor diameter including a second differential gearing having a centerbody, said centerbody having an output shaft fixed thereto, two input differential gears mounted for rotation on the output shaft of said centerbody, two differential drive gears fixed on two of said three coaxial shafts driving said two differential input gears, an idler gear in the drive between one shaft and one of said input gears of said second differential gearing, a gear mounted for rotation on said centerbody and meshing with both of said input gears, a multi-turn potentiometer driven from said differential output shaft, and rotor diameter indicating means electrically connected with said potentiometer.

* * * * *